(12) United States Patent
Myerchin

(10) Patent No.: US 11,137,795 B2
(45) Date of Patent: Oct. 5, 2021

(54) ELECTROMAGNETIC LOCKING SYSTEM FOR DISPLAY SUPPORT ARMS

(71) Applicant: Myerchin Enterprises, Inc., Bellevue, WA (US)

(72) Inventor: Christian P. Myerchin, Bellevue, WA (US)

(73) Assignee: Myerchin Enterprises, Inc., Bellevue, WA (US)

( * ) Notice: Subject to any disclaimer, the term of this patent is extended or adjusted under 35 U.S.C. 154(b) by 16 days.

(21) Appl. No.: 16/245,074

(22) Filed: Jan. 10, 2019

(65) Prior Publication Data

US 2020/0225695 A1 Jul. 16, 2020

(51) Int. Cl.
| | |
|---|---|
| *G06F 1/16* | (2006.01) |
| *F16M 11/12* | (2006.01) |
| *F16M 11/18* | (2006.01) |

(52) U.S. Cl.
CPC ........... *G06F 1/1601* (2013.01); *F16M 11/12* (2013.01); *F16M 11/18* (2013.01); *F16M 2200/022* (2013.01); *F16M 2200/065* (2013.01)

(58) Field of Classification Search
CPC ...... G06F 1/1601; F16M 11/18; F16M 11/12; F16M 2200/022; F16M 2200/065
See application file for complete search history.

(56) References Cited

U.S. PATENT DOCUMENTS

| 5,944,151 | A * | 8/1999 | Jakobs | G05G 1/08 |
| | | | | 188/267.1 |
| 6,019,332 | A * | 2/2000 | Sweere | A47B 21/00 |
| | | | | 248/280.11 |
| 9,020,615 | B2 * | 4/2015 | Rihn | F16M 11/10 |
| | | | | 700/19 |
| 9,541,125 | B1 * | 1/2017 | Satoh | F16C 11/106 |
| 2006/0186295 | A1 * | 8/2006 | Dittmer | F16M 11/041 |
| | | | | 248/284.1 |
| 2010/0061041 | A1 * | 3/2010 | Chen | F16M 11/2064 |
| | | | | 361/679.01 |
| 2010/0193647 | A1 * | 8/2010 | Huang | F16M 11/18 |
| | | | | 248/124.1 |
| 2013/0021723 | A1 * | 1/2013 | Harper | G06F 1/1681 |
| | | | | 361/679.01 |
| 2014/0353453 | A1 * | 12/2014 | Quijano | F16M 11/2021 |
| | | | | 248/419 |

(Continued)

*Primary Examiner* — James Wu
*Assistant Examiner* — Christopher L Augustin
(74) *Attorney, Agent, or Firm* — Æon Law; Adam L. K. Philipp; David V. H. Cohen

(57) ABSTRACT

At least one touch sensitive zone detects user touch on or near a display. The touch sensitive zone triggers one or more electrical brake components that control friction of axial rotation about one or more display arm pivot points. At least one display arm pivot point is non-pivotally attached to at least one arm brake component, and at least one axial brake component is held such that it will not rotate about the axial movement of the display arm. At least one of the brake components will require electrical power to activate. At least one electric circuit is used to control power to the brake component. When the brake component is de-energized the display arm can pivot with reduced torsional resistance. When the brake component is energized it creates friction, thus adding torsional resistance to the display arm pivot point.

19 Claims, 12 Drawing Sheets

(56) References Cited

U.S. PATENT DOCUMENTS

| | | | | |
|---|---|---|---|---|
| 2015/0369418 A1* | 12/2015 | Wong | .................... | F16M 11/041 |
| | | | | 248/372.1 |
| 2016/0319986 A1* | 11/2016 | Horndler | ................ | F16M 11/42 |
| 2017/0315656 A1* | 11/2017 | Guard | ..................... | G06F 3/044 |
| 2018/0155969 A1* | 6/2018 | Mislak | .................. | E05B 65/006 |
| 2019/0212785 A1* | 7/2019 | Choi | ...................... | F16M 11/00 |
| 2019/0344595 A1* | 11/2019 | Akahane | .................. | B41J 11/42 |

* cited by examiner

ELECTROMAGNETIC LOCKING SYSTEM FOR DISPLAY SUPPORT ARMS

FIELD

The present invention relates to systems and methods for supporting objects such as flat panel displays.

BACKGROUND

In various mounting systems for flat panel displays, a display is attached to one end of an articulating arm or series of articulating arms. A user may position the display based on their needs or comfort by rotating the pivot points of the arm or arms.

Many mounting systems for flat panel displays add friction to arm pivot points to aid in keeping the display in a desired position. Friction at the pivot points helps hold the display in position but makes changing the positioning of the screen more difficult. The user must expend more effort to move the display when compared to a configuration where additional friction has not been added. It can also be difficult to apply enough force to overcome static friction to get the arms to move and not apply too much force to move the arms a small amount or to position the arms precisely.

Another solution is to have a user-controlled locking mechanism for arm pivot points. This way the user controls when friction is applied to lock the screen. For example, some systems use mechanical linkages to hold a display in position. The user must, e.g., loosen/tighten a screw or press/release a lever to unlock/lock the display for repositioning. These systems are slow to activate and may require substantial effort by a user to engage or disengage the locking mechanism. They may also require complicated mechanics, thus reducing reliability and increasing costs.

In one such system, U.S. Pat. No. 7,042,714 ("Hillman") discusses a mechanical system where a locking actuator handle or lever protrudes from the center of the back of the display to the side edge. The actuator handle controls a tension cable that runs through ball-and-socket assemblies and applies friction to hold the display in place.

In some variations on that system, an electromagnetic control or other actuator takes the place of the lever or handle to loosen or tighten the joints and can control an electric motor that threads or unthreads a screw to apply or release tension to the cable. Using a motor to lock the display is slow. When a user moves the display to a new position, the user cannot immediately release the display until the motor has tensioned the cable. Hillman therefore calls for a switch that provides the user tactile feedback that the motor assembly has been actuated, which adds further complexity.

Another approach with a different kind of complexity is found in Japanese patent application JP2001252313 ("Yasumasa"). Yasumasa discusses a dental display arm system in which a handle is attached to the side of a display and a switch is provided in or near the handle to control pneumatic or electromagnetic brakes for a dental work table. When a user grabs the handle to operate the switch, brakes on the work table lock and brakes on the display arm release. Attaching a handle to protrude from the side of a display may work well for a bulky, industrial dental table but would be an impractical configuration in settings such as for a home or office, where such a protrusion can bump into or catch on other desktop items. Moreover, a handle that protrudes from the screen, in addition to being unattractive, is awkward in many situations, such as when exerting a torque on the screen to change its tilt. A user's natural tendency is to simply grab the screen, change its position, then release it with the expectation that the screen's new position is maintained. Furthermore, an approach like Yasumasa's system requires the coordinated operation of multiple components far from the display, involving extensive cabling or linkages that would be expensive and difficult to implement, making it generally unsuitable.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Detailed Description, which is to be read in association with the accompanying drawings, wherein.

DETAILED DESCRIPTION

Figure 1:
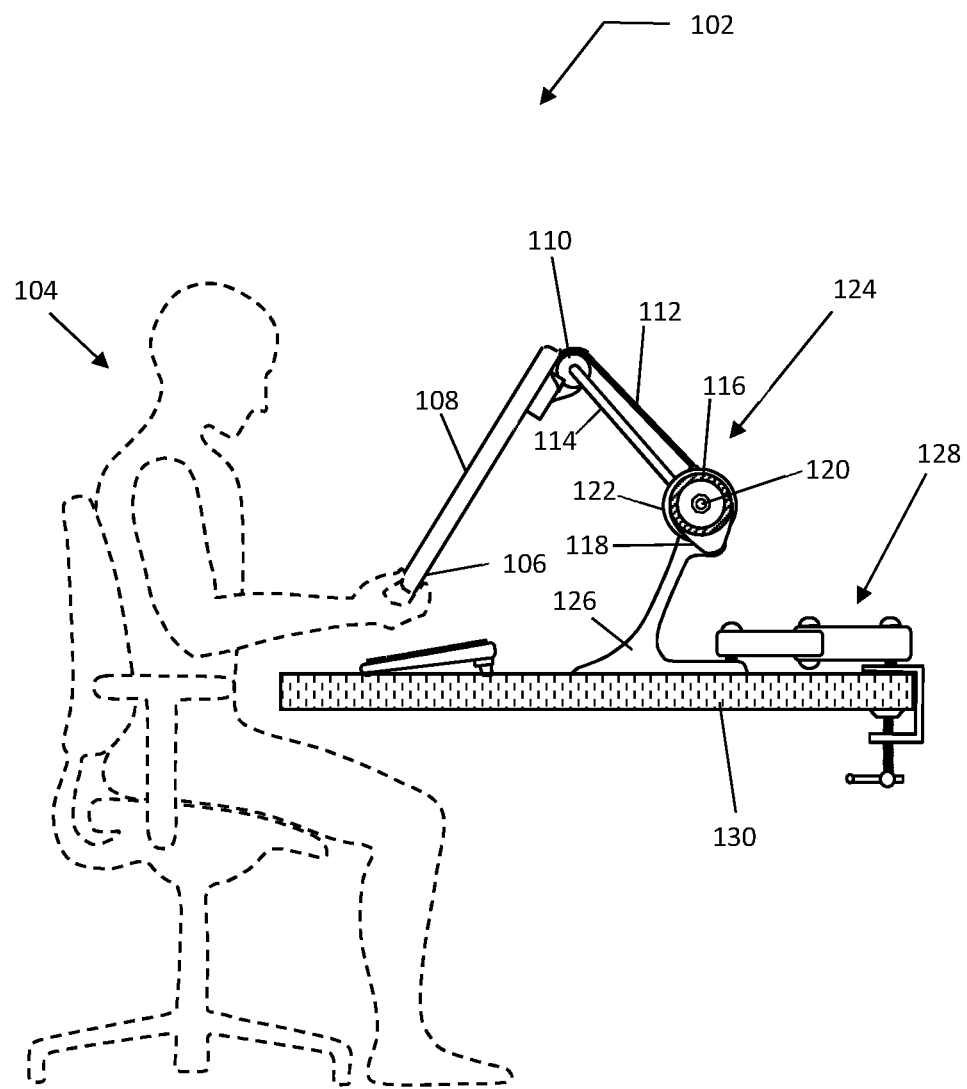
FIG. 1 illustrates a side view of a desktop display environment including a multi-arm display anti-toppling mechanism with an electromagnetic locking system in accordance with at least one embodiment.

There is a need for a user controlled locking mechanism for display arm pivot points to prevent unwanted movement at the arm pivot points. The locking system should be fast acting, simple, and inexpensive. The lock actuator should be easily reached by the user in the display pivot positions. Good operation requires both a fast locking response and controls for locking that are easy to operate. The pivoting arms make the display position highly variable. It's important that the locking control points be easy to reach in multiple display positions and that they not cause false triggers.

A flat panel display mounting system with an electromagnetic braking system controlled by touch sensitive zone(s) on or near the display. The electromagnetic braking system uses one or more electromagnets directly attracted to a pivoting magnetic brake surface. The brake construction is simple, inexpensive and fast acting. Large touch zones are easily reached by the user in the display pivot positions.

Embodiments now will be described more fully hereinafter with reference to the accompanying drawings, which form a part hereof, and which show, by way of illustration, specific embodiments which may be practiced. This invention may, however, be embodied in many different forms and should not be construed as limited to the embodiments set forth herein; rather, these embodiments are provided so that this disclosure will be thorough and complete, and will fully convey the scope to those skilled in the art. The following detailed description is, therefore, not to be taken in a limiting sense.

Throughout the specification and claims, the following terms take the meanings explicitly associated herein, unless the context clearly dictates otherwise. References to "one embodiment," "an embodiment," "another embodiment," as used herein indicates that a particular feature, structure, or characteristic described in connection with the embodiment is included in at least one embodiment. However, the phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "flat panel display", it should be readily apparent to one of skill in the art that the term flat panel includes screens with curvature. The terms "electromagnet" and "magnetic braking surface" are frequently interchangeable because of the relative nature to which one is fixed and which one can rotate.

The term "display arm", refers to a ridged body with one or more pivot points that wholly or partially support the weight of the display.

The term "display arm brake component", refers to a brake component that is attached in such a way that it pivots when the display arm pivots.

The term "axial brake component", refers to a brake component that is attached in such a way that it does not pivot when the display arm pivots and that it aligns with one or more display arm brake components.

The following briefly describes the various embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated embodiments are directed towards an apparatus usable to support a flat panel display, the apparatus comprising:
a base assembly with pivotal connection and flat panel display or a display mounting plate with connection;
at least one rigid display arm having pivotal connections on either end where one or more arms pivotally connect between the base assembly and flat panel display or a display mounting plate; at least one display arm brake component that is non-pivotally attached to the display arm; and at least one axial brake component that is held such that it will not rotate about the display arm pivot point;
at least one touch sensitive zone located near or on one or more of the following locations on the flat panel display: back side perimeter, right side, left side, top side, bottom side, front side bezel; at least one electric circuit to control power to the brake component;
and when the touch sensitive zone detects a touch the brake component is de-energized the display arm can pivot with reduced torsional resistance; and when the touch sensitive zone detects no touch the brake component is energized it will attract to another brake component and create friction thus adding torsional resistance to display arm pivot point.

PARTIAL LIST OF REFERENCE NUMERALS 102. environment of operation
104. user
106. touch sensitive zone
108. display
110. cam
112. belt
114. display arm
116. electromagnet
118. electromagnet housing
120. display arm pivot point
122. magnetic braking surface
124. electromagnetic brake assembly
126. display base
128. anti-toppling arms
130. desk
214A. display arm left
214B. display arm right
216A. electromagnet left
216B. electromagnet right
218. electromagnet housing
220. display arm pivot point
222A. magnetic braking surface left
222B. magnetic braking surface right
250. shaft
252. spring leg retention pin
254. base plate
256. torsion spring
258. electromagnet housing pin
260. electromagnet wires
262. left side electromagnetic brake
264. right side electromagnetic brake
300A. display post left
300B. display post right
308. display
310. touch sensitive zone
480. Touch Detection Circuit
482. Electromagnet Power Control Circuit
484. Electromagnet Part
514A. display arm left
514B. display arm right
516A. electromagnet left 516B. electromagnet right
520. display arm pivot point
522. magnetic braking surface
550. shaft
554. base plate
614A. display arm left
614B. display arm right
616A. electromagnet top
616B. electromagnet bottom
620. display arm pivot point
622. drum magnetic braking surface
650. shaft
654. base plate
658. electromagnet holder
700A. display post left
700B. display post right
708. display
710. touch sensitive zone
800A. display post left
800B. display post right
808. display
810A. touch sensitive zone lower left
810B. touch sensitive zone lower right
980. Touch Detection Circuit
982. Electromagnet Power Control Circuit
984. Electromagnet Part
986. Computer Control
1008. Display
1060. 1061. 1062. 1063. 1064. 1065. 1066. 1067. pivoting braking points
1071. display mounting plate
1072. display mount arms
1073. 1074. 1075. 1076. display arm
1077. magnetic braking surface
1078. electromagnet
1079. display arm hub
1080. electromagnet
1081A. 1081B. parallel display arm
1082. gas shock
1083. magnetic braking surface
1084. electromagnet
1085. magnetic braking surface
1086. electromagnet
1087. magnet support
1088. base plate
1089. display arm hub
1091. 1092. 1093. 1094. touch sensitive zone
1095. 1096. 1097. 1098. accessory arms
1108. display
1106. touchbar
1112. belt
1114. display arm
1116. electromagnet
1120. display arm pivot point
1128. anti-topping arms

ILLUSTRATIVE EMBODIMENTS

Each of the FIGURES discussed below may include many more or less components than those shown in the FIGURES. Moreover, not all the components may be required to practice various embodiments and variations in the arrangement and type of the components may be made. However, the components shown are sufficient to disclose various illustrative embodiments for practicing the present invention.

FIG. 1 illustrates a side view of a desktop display environment including a multi-arm display anti-toppling mechanism with an electromagnetic locking system in accordance with at least one embodiment. In one embodiment touch sensitive zone 106 attached to back of display 108. Display 108 is rigidly attached to cam 110 and cam 110 is wrapped by belt 112. Belt 112 is pivotally attached to display base 126. One end of display arm 114 is pivotally connected to cam 110 and the other end of display arm 114 is pivotally connected to display base 126 at display arm pivot point 120. Magnetic braking surface 122 is rigidly attached to display arm 114. Electromagnet housing 118 is attached the display base 126 such at it will not allow movement axially around display arm pivot point 120 but allow slight movement toward magnetic brake surface 122. Electromagnet 116 is rigidly attached to electromagnet housing 118. Display base 126 is pivotally attached to anti-toppling arms 128. Anti-toppling arms 128 are clamped to desk 130.

In environment of operation 102 a user 104 grips the touch sensitive zone 106 on the display 108. The user 104 touch on the touch sensitive zone 106 is detected by an electrical circuit. The electrical circuit turns off power to the electromagnet 116. The electromagnet 116 unlocks from magnetic braking surface 122 and allows the display arm 114 pivotal movement about display arm pivot point 120. When unlocked, the user 104 can pull the bottom of display 108 toward them or push the bottom of display 108 away from them. When the display 108 is moved belt 112 winds or unwinds around cam 110 and thus imparts a torque to rotate the display 108 such that display 108 is rotated to a horizontal position when pulled forward and rotated to a vertical position when pushed back. When the user 104 releases touch sensitive zone 106 this is detected by the electrical circuit. The electrical circuit turns on power to electromagnet 116. This attracts electromagnet 116 toward magnetic braking surface 122 thus applying friction to lock display arm pivot point 120 from rotating. When locked the friction force about display arm pivot point 120 makes it difficult for the user 104 to move the display 108 and reduces unintended movement.

In one embodiment cam 110 and belt 112 is used rotate display 108 to a horizontal position when pulled forward and rotated to a vertical position when pushed back. In other embodiments, display 108 may be rotated by multiple arms, gears or other means capable of positioning the display 108 to horizontal when pulled forward and positioning the display 108 to vertical when pushed back.

In one embodiment electromagnetic brake components are located about display arm pivot point 120. In another embodiment, electromagnetic brake components are located about pivot point between display arm 114 and cam 110. In another embodiment, electromagnetic brake components are located both at about pivot point between display arm 114 and cam 110 and display arm pivot point 120.

In various embodiments, display arm brake components and axial brake components may be arranged on either side of a joint. Components that are fixed relative to a joint or that inhibit or prevent rotation of or relative to a joint may, without limitation, be arranged on either side of pivotal connections in a base assembly, display arm(s), and/or a display mount.

Figure 2:
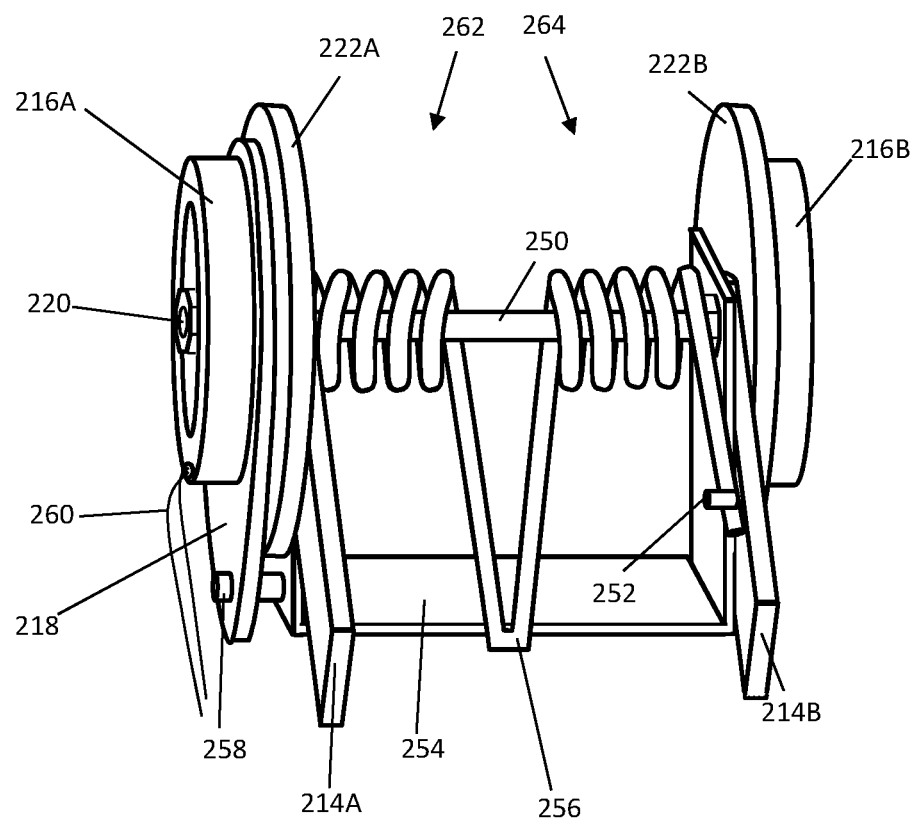
FIG. 2 illustrates an alternate and truncated perspective view of the electromagnetic braking system shown in FIG. 1.

FIG. 2 illustrates an alternate and truncated perspective view of the electromagnetic braking system shown in FIG. 1. In one embodiment electromagnet left 216A is rigidly attached to electromagnet housing 218. Electromagnet housing pin 258 passes through electromagnet housing 218 and is rigidly connected to base plate 254. Magnetic braking surface left 222A is rigidly attached to display arm left 214A. Shaft 250 is rigidly coupled to display arm left 214A and rotates about display arm pivot point 220. Torsion spring 256 wraps shaft 250 and contacts base plate 254 and both display arm left 214A and display arm right 214B. The right side of the of the illustration showing right side electromagnetic brake 264 which includes display arm right 214B, magnetic braking surface right 222B and electromagnet right 216B is constructed as a mirror image of the left side electromagnetic brake 262.

In one embodiment the electromagnet left 216A is an axial brake component that does not rotate about display arm pivot point 220, and magnetic braking surface left 222A is another axial brake component that is non-pivotally attached to display arm left 214A. Either brake component may be an electromagnet or a magnetic braking surface but at least one component must be an electromagnet.

In one embodiment the electromagnet left 216A is allowed to move toward or away from magnetic braking surface left 222A that is rigidly attached to display arm left 214A. In another embodiment, electromagnet left 216A is rigidly attached to base plate 254 and magnetic braking surface left 222A which is allowed to move toward or away from electromagnet left 216A. In one embodiment the electromagnet and braking surface are slidably arranged to need little to no allowance for movement toward or away from each other.

In one embodiment the magnetic braking surfaces 222A and 222B are made of ferrous or ferromagnetic material, e.g., steel (iron). In other embodiments, braking surface may be made of magnetite, cobalt or other magnetic material.

In one embodiment the electromagnet left 216A directly contacts magnetic braking surface left 222A. In another embodiment a brake pad may be placed between the two surfaces. The brake pad may aid friction or noise abatement. Another embodiment may employ the use of magnetoviscous materials such as ferrofluid to aid in the braking ability of the electromagnet left 216A and electromagnet right 216B to the magnetic braking surface left 222A and magnetic braking surface right 222B. Another embodiment may employ the use of stacked brake surfaces where alternating layers of magnetic brake surfaces either rotate with arms or remain fixed relative to arm rotation.

In one embodiment two electromagnets left 216A and electromagnets right 216B are used to lock display arm pivot point 220. In another embodiment only one electromagnet is used. In other embodiments more than two electromagnets are used.

In one embodiment display arm left 214A and magnetic braking surface left 222A are separate units. In other embodiments the two items may be comprised of a single unit.

Figure 3:
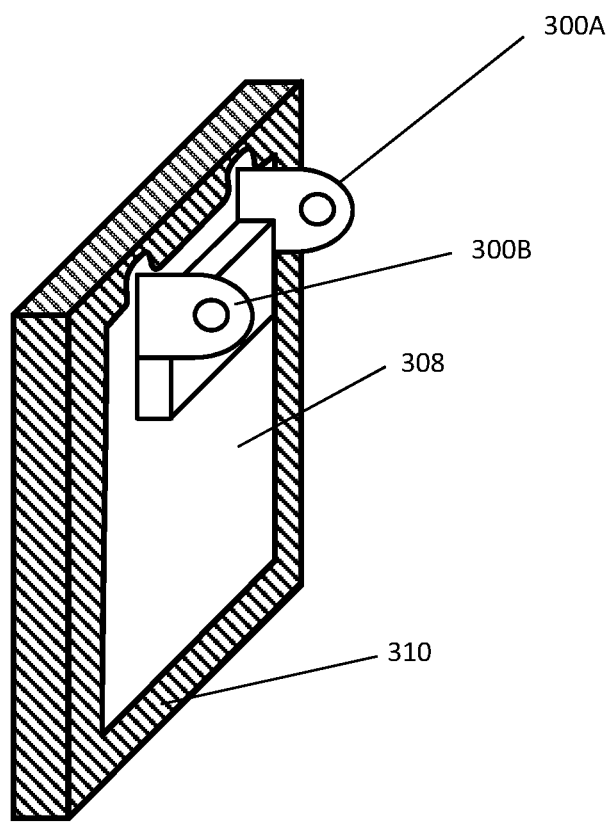
FIG. 3 illustrates a perspective view of one embodiment where touch actuator zones are located on the sides and back of the display.

FIG. 3 illustrates a perspective view of one embodiment where touch actuator zones are located on the sides and back of the display. In one embodiment touch sensitive zone 310 surrounds the top, bottom, right and left sides of the display 308 and surrounds the perimeter of the back side. Display post left 300A and display post right 300B attach to display 308. Display arm or arms may be pivotally attached to display posts.

In one embodiment touch sensitive zone 310 surrounds the top, bottom, right and left sides of the display 308 and surrounds the perimeter of the back side. In other embodiments one or more touch sensitive zones may be located on the display 308 back side perimeter, the display 308 top, bottom, right and left sides, or the display 308 front bezel perimeter outside of the active display surface.

In one embodiment, display post left 300A and display post right 300B are permanently attached to display 308. In another embodiment display posts are members of a rigid plate. The plate may be attached to display 308 via a removable means.

In one embodiment touch detection components are located on the display 308. In other embodiments the touch detection components may be held close to the display 308 and attached to accessory arms that are attached to a display arm or display holder. This allows display 308 to be removable without affecting the placement or wiring of the touch zones.

Figure 4:
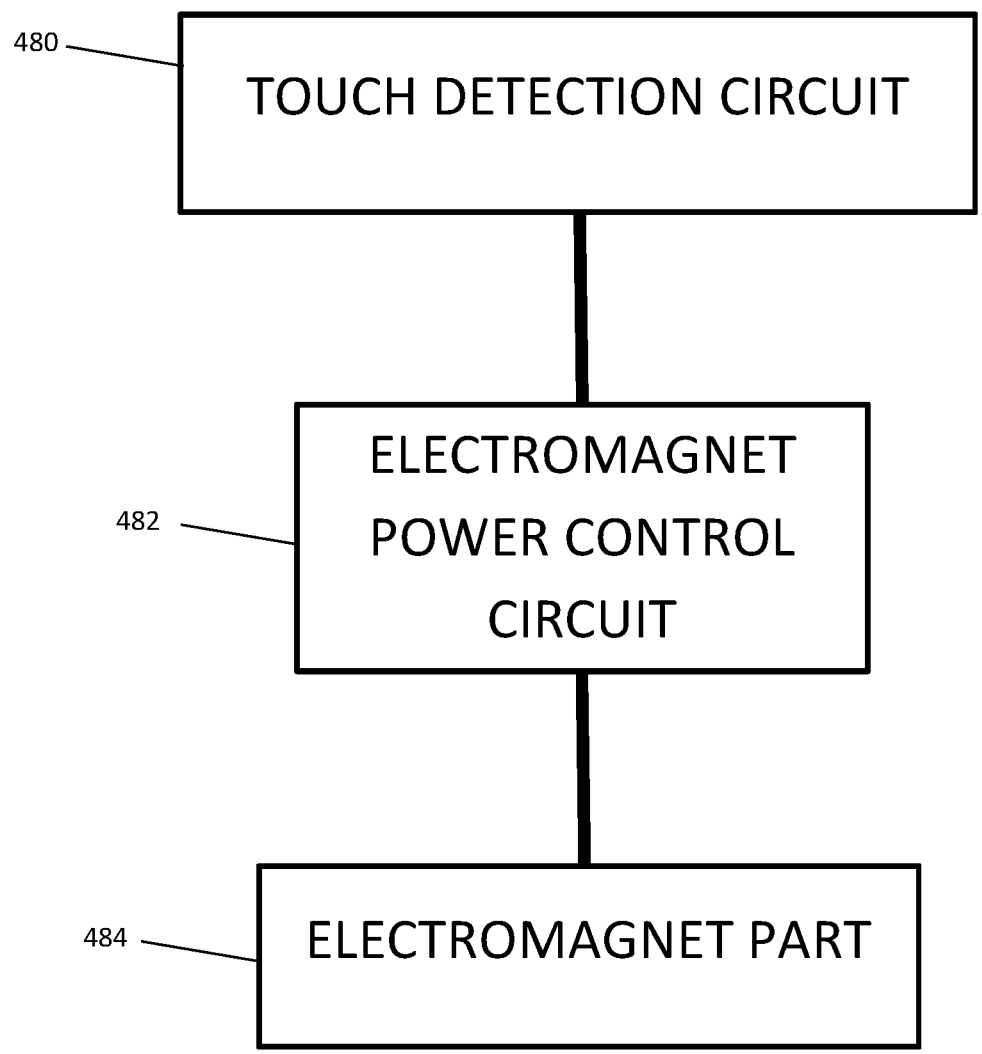
FIG. 4 illustrates a block diagram view of one embodiment where touch detection connects to electromagnet directly through electromagnet power control.

FIG. 4 illustrates a block diagram view of one embodiment where touch detection connects to electromagnet directly through electromagnet power control. In one embodiment, the touch detection circuit 480 connects to the electromagnet power control circuit 482 and the electromagnetic power control circuit 482 connects with the electromagnet part 484. In other embodiments, one or more touch detection circuits 480 connect to one or more electromagnet power control circuits 482 and connects with one or more electromagnet parts 484.

In one embodiment touch detection circuit 480 uses an electrically conductive surface or layer over an insulating barrier that is used for capacitive touch detection. In another embodiment touch detection circuit 480 uses a photo interrupter to project a beam of light over the touch zone. In another embodiment touch detection circuit 480 uses two or more open circuit conductive paths where touch is determined though a change in electrical resistance between the paths. In another embodiment touch detection circuit 480 uses a surface acoustic wave sensor. In other embodiments, touch detection circuit 480 may use other sensors to detect user touch provided the methods trigger a signal that is used by the electromagnet power control circuit 482, can operate over large surface areas.

In one embodiment touch detection circuit 480 having no mechanically actuated parts is used to detect touch. In other embodiment one or more mechanical switches are attached to a plate that covers a touch zone.

In one embodiment the touch detection circuit 480 uses both capacitive and optical sensors together to detect touch. In another embodiment the touch detection circuit 480 uses capacitive, optical sensors and surface acoustic wave together to detect touch. In another embodiment multiple sensing technologies are used together to detect user touch provided the sensors trigger a signal that is used by the electromagnet power control circuit 482, can operate over large surface areas and do not use mechanical switch to create an electrical contact when pressed by the user.

In one embodiment electromagnet power control circuit 482 controls power to the electromagnet part 484 by a power MOSFET. In other embodiments electromagnet power control circuit 482 may control power via bipolar junction power transistors, silicon control rectifiers, relays, or any other device capable of quickly switching power on or off.

In one embodiment electromagnet power control circuit 482 applies power to the electromagnet part 484 at a constant rate. In other embodiments electromagnet power control circuit 482 varies the power applied to electromagnet part 484. By continually matching power applied to electromagnet part 484 with the friction force required to hold that the display arm pivot point the overall power used by electromagnet part 484 may be reduced.

In one embodiment electromagnet power control circuit 482 always reacts to touch detection circuit 480 signals. In other embodiments, external switches or control mechanisms may override the electromagnet power control circuit 482 control of the electromagnet part 484.

In one embodiment touch detection circuit 480 is connected to electromagnet power control circuit 482 by conductive wires to transmit touch signals. In another embodiment touch signals are transmitted wirelessly between touch detection circuit 480 and electromagnet power control circuit 482.

Figure 5:
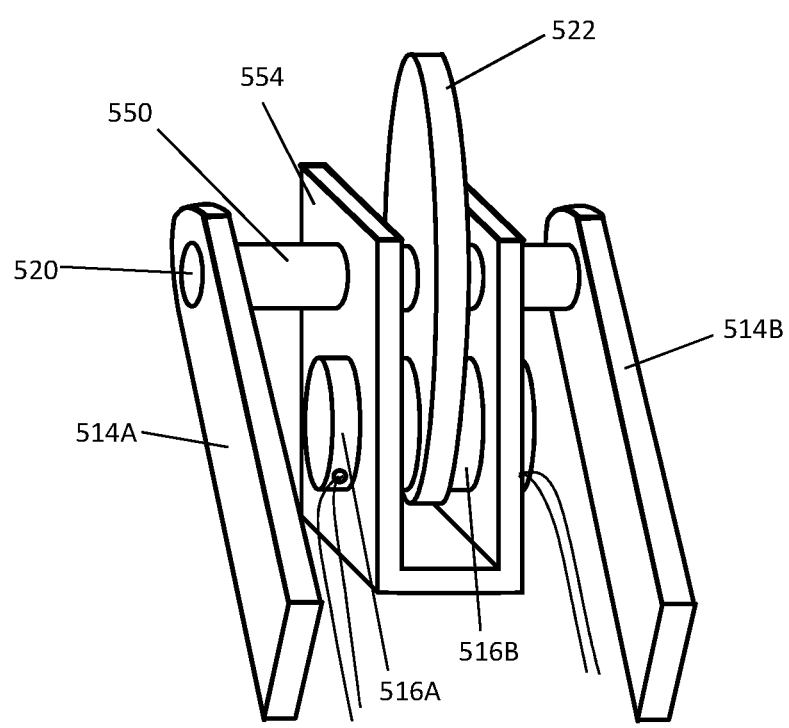
FIG. 5 illustrates a perspective view of one embodiment where electromagnets are offset from the center of axial movement of display arms.
Figure 6:
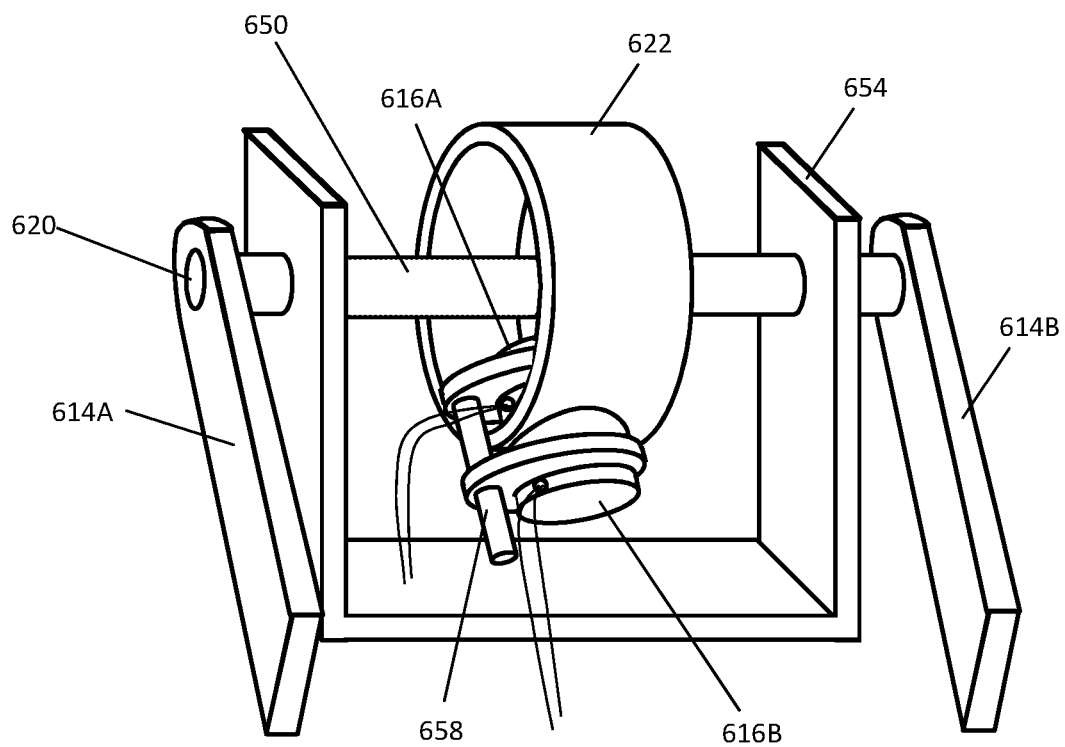
FIG. 6 illustrates a perspective view of one embodiment where electromagnets are perpendicularly aligned with the axial movement of display arms.

The embodiments of FIG. 5 and FIG. 6 show non-limiting placement options of electromagnets. Both FIG. 5 and FIG. 6 could be used in place of FIG. 2 and operate using the common concept where one brake component is attached to pivot with a display arm; another brake component is attached to not pivot with the display arm; at least one of the brake components is an electromagnet. When the electromagnet is energized it will adhere to the opposite brake component and cause friction against the pivoting motion of the display arm. FIGS. 5 and 6 are meant to show the concept of operation is not limited to electromagnet size and location.

FIG. 5 illustrates a perspective view of one embodiment where electromagnets are offset from the center of axial movement of display arms. In one embodiment electromagnet left 516A and electromagnet right 516B pass through base plate 554 such that electromagnet movement is allowed toward magnetic braking surface 522 but not axially around display arm pivot point 520. Shaft 550 pivots about display arm pivot point 520. Magnetic braking surface 522 is rigidly attached to shaft 550. Shaft 550 passes through base plate 554 and rigidly attaches to display arm left 514A and display arm right 514B.

In one embodiment the electromagnet left 516A and electromagnet right 516B are axial brake components that do not rotate about shaft 550, and magnetic braking surface 552 is a display arm brake component that is non-pivotally attached to shaft 550. In another embodiment, the axial brake components are magnetic braking surfaces and the display arm brake component is an large electromagnet. In another embodiment, both the axial brake components and the display arm brake component may be electromagnets.

In one embodiment a magnetic braking surface 522 is a full circular disk. In other embodiments the magnetic braking surface is not circular shaped. Display arm left 514A and display arm right 514B may have a rotational range less than 360 degrees. The magnetic braking surface is only as large as needed to align with the small rotation range of display arm left 514A and display arm right 514B.

FIG. 6 illustrates a perspective view of one embodiment where electromagnets are perpendicularly aligned with the axial movement of display arms. In one embodiment electromagnet top 616A and electromagnet bottom 616B pass through electromagnet holder 658 such that movement is allowed toward drum magnetic braking surface 622 but not axially around shaft 650. Drum magnetic braking surface 622 is rigidly attached to shaft 650. Shaft 650 passes through base plate 654 and rigidly attaches to display arm left 614A and to display arm right 614B.

In one embodiment electromagnet top 616A and electromagnet bottom 616B are axial brake components that do not rotate about shaft 650, and drum magnetic braking surface 622 is a display arm brake component that is non-pivotally attached to shaft 650. In another embodiment, the axial brake components are magnetic braking surfaces and the display arm brake component is an electromagnet.

In one embodiment electromagnet top 616A and electromagnet bottom 616B are aligned 90 degrees with shaft 650. In another embodiments, the electromagnets may be aligned at other angles relative to shaft 650 provided the display arm brake components align with the electromagnets.

Figure 7:
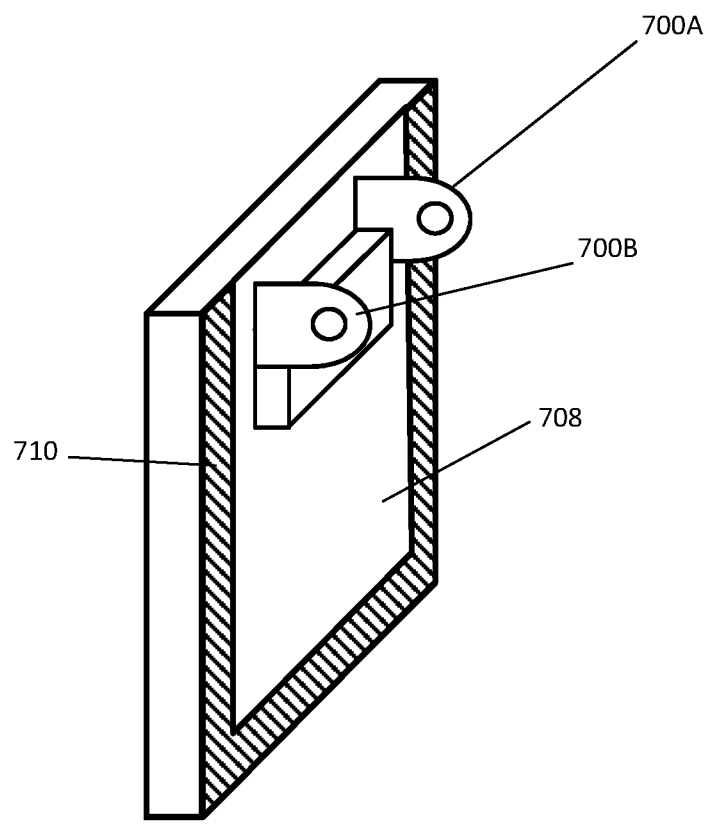
FIG. 7 illustrates a perspective view of one embodiment where touch actuator zones are located on the back of the display.
Figure 8:
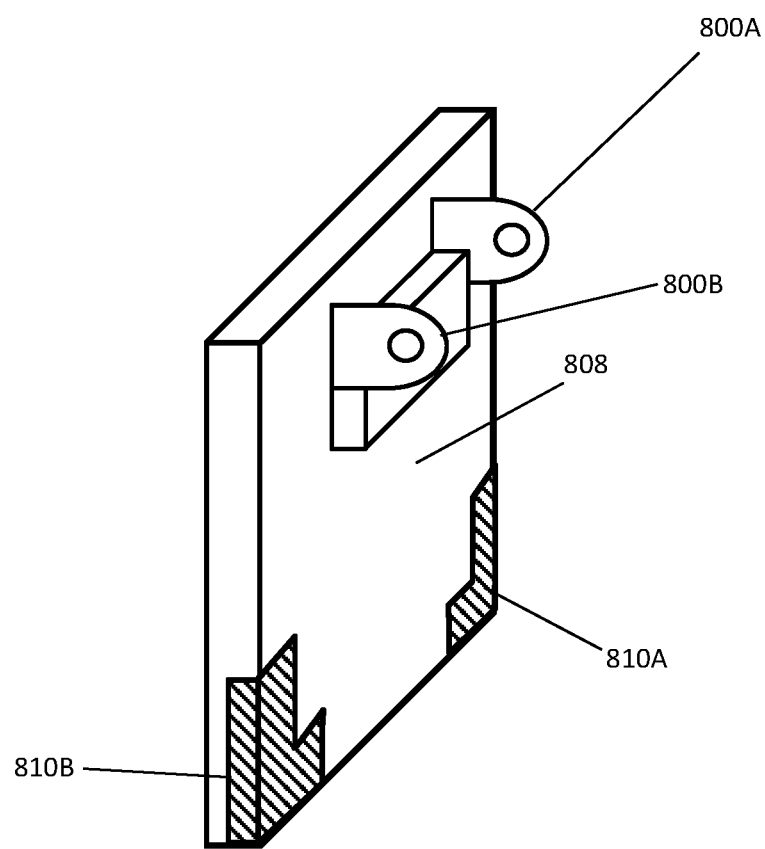
FIG. 8 illustrates a perspective view of one embodiment where touch actuator zones are located on lower corner the sides and back of the display.

The embodiments of FIG. 7 and FIG. 8 show non-limiting placement options of touch sensitive zones. Both FIG. 7 and FIG. 8 could be used in place of FIG. 3 and operate using the common concept where a touch is detected at or near a touch sensitive zone.

FIG. 7 illustrates a perspective view of one embodiment where touch actuator zones are located on or at the back of the display. In one embodiment touch sensitive zone 710 surrounds the back perimeter of the, right side, left side and bottom of the display 708. Display post left 700A and display post right 700B attach to display 708. Display arm or arms may be pivotally attached to display posts.

FIG. 8 illustrates a perspective view of one embodiment where touch actuator zones are located on or at lower corners of the sides and back of the display. In one embodiment touch sensitive zone left 810A is located on the left lower back perimeter and adjacent side perimeter of display 808. Touch sensitive zone right 810B is located on the right lower back perimeter and adjacent side perimeter of display 808. Display post left 800A and display post right 800B attach to display 808. Display arm or arms may be pivotally attached to display posts.

In one embodiment touch sensitive zone left 810A controls a set of one or more electromagnet(s), referred to a set A. Touch sensitive zone right 810B controls a set of one or more electromagnet(s), referred to a set B. In one embodiment, Set A electromagnet(s) may be exclusive of Set B electromagnet(s). In another embodiments the Set A and Set B may be equal or one set may may be a subset of the other.

In one embodiment touch sensitive zone left 810A uses capacitive touch detection and touch sensitive zone right 810A surface acoustic wave touch detection. In another embodiments with more than one touch sensitive zone each zone may use one or more touch sensing technologies that are different from touch sensing technologies used by other touch sensitive zones.

Figure 9:
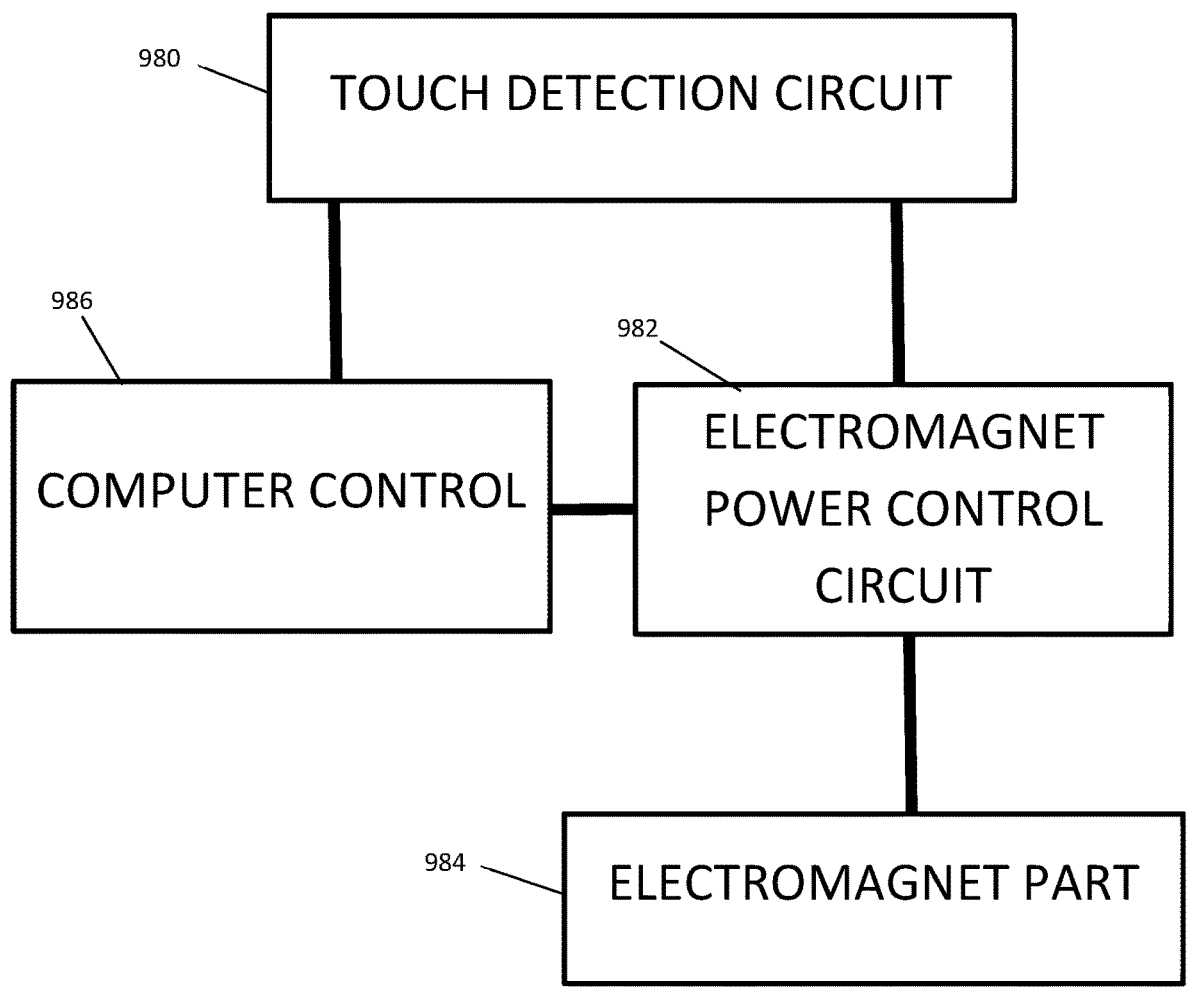
FIG. 9 illustrates a block diagram view of one embodiment where computer control connects to touch detection circuit and electromagnet power control circuit.

FIG. 9 illustrates a block diagram view of one embodiment where computer control 986 connects to touch detection circuit 980 and electromagnet power control circuit 982. In one embodiment, the touch detection circuit 980 connects to the electromagnet power control circuit 982 and to computer control 986. Computer control 982 also connect to electromagnet power control circuit 982. Electromagnet power control circuit 982 connects to the electromagnet part 984.

In one embodiment, computer control 986 may consist of a personal computer. In other embodiments computer control 986 may consist of a microcontroller or a network connected computer or any other computer that requires information from or control of touch detection circuit 980 or electromagnet power control circuit 982.

In one embodiment, touch detection circuit 980 will signal both computer control 986 and electromagnet power control circuit 982 when touch is detected. In another embodiment the signal from touch detection circuit 980 to electromagnet power control circuit 982 may not be used and computer control 986 will determine if and/or how the touch signal is propagated to electromagnet power control circuit 982.

In one embodiment, computer control 986 has no control of touch detection circuit 980. In other embodiments computer control 986 may affect the operation of touch detection circuit 980, such as adjusting touch sensitivity for one or more sensors or disabling touch detection for one or more sensors or other touch sensor control operations.

In one embodiment that combines features of FIG. 1 and FIG. 9 user 104 activity with near the surface of the display 108 can be detected and sent to computer control 986. Computer control 986 can signal electromagnet power control 982 to increase power to the electromagnet part 984 in anticipation of the higher frictional force required when user 104 touches the display 108.

Figure 10:
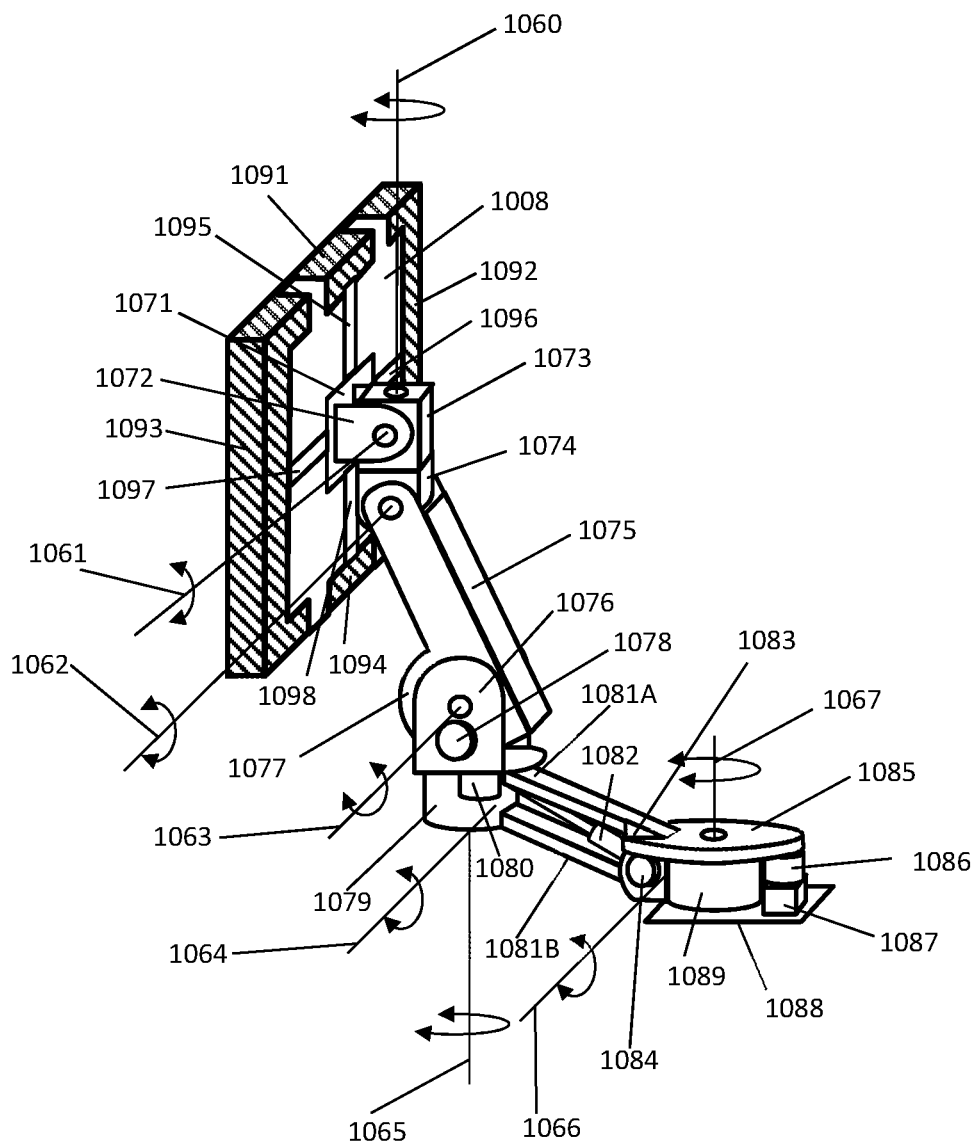
FIG. 10 illustrates a perspective view of one embodiment where of a display support system has multiple axial rotation points that may be electromagnetically locked.

FIG. 10 illustrates one embodiment of braking display support system with multiple braking pivot points. Display mounting plate 1071 is fastened to display 1008. Display mount arms 1072 are rigidly attached display mounting plate 1071. Display mount arms 1072 are pivotally connected to display arm 1073 about the pivot axis 1061. The pivot axis 1061 may use an electromagnet for braking. Display arm 1073 is pivotally connected to display arm 1074 about the pivot axis 1060. The pivot axis 1060 may use an electromagnet for braking. Display arm 1074 is pivotally connected to display arm 1075 about the pivot axis 1062. The pivot axis 1062 may use an electromagnet for braking. Display arm 1075 is pivotally connected to display arm 1076 about the pivot axis 1063. The pivot axis 1063 uses electromagnet 1078 for braking. Braking surface 1077 is an extension of display arm 1075 and the two components are constructed as a single unit. Display arm 1075 may include a mechanism to provide an upward torque at pivot point 1063. Display arm 1076 is pivotally connected to display arm hub 1079 about the pivot axis 1065. The pivot axis 1065 uses electromagnet 1080 for braking. Parallel display arms 1081A and 1081B are pivotally connected to display arm hub 1079 and display arm hub 1089 about pivot axis 1064 and pivot axis 1066. The pivot axis 1066 uses electromagnet 1084 and magnetic braking surface 1083 for braking parallel display arms 1081A and 1081B. In another embodiment electromagnet 1084 and braking surface 1083 could be moved adjacent to display arm hub 1079. Gas shock 1082 provides a counterbalance torque to parallel display arms 1081A and 1081B to prevent the upper assembly from falling. Display arm hub 1089 is pivotally connected to base plate 1088 about pivot axis 1067. Magnetic braking surface 1085 is rigidly attached to display arm hub 1089. Magnet support 1087 is rigidly attached to base plate 1088. Electromagnet 1086 can lock pivot axis 1067. Touch sensitive zones 1091,1092,1093 and 1094 are rigidly connected to display plate 1071 by accessory arms 1095, 1096, 1097 and 1098. Touch sensitive zones 1091, 1092, 1093 and 1094 are held in close proximity to display 1008.

In some embodiments, multiple groupings of brake components can be controlled together. In some embodiments, each braking pivot point can include a grouping of brake components that is separately controllable, e.g., by a different touch sensitive zone. In one embodiment touch sensitive zone 1093 will control vertical pivoting braking points 1061, 1062, 1063, 1064 and 1066. Touch sensitive zone 1092 will control horizontal pivoting braking points 1060, 1065, 1067. Touch sensitive zones 1091 and 1094 will control all pivoting braking points 1060, 1061, 1062, 1063, 1064 1065, 1066 and 1067. In other embodiments one or more touch sensitive zones may control one or more electromagnet braking points. In one embodiment the electromagnet braking points shown 1078, 1080, 1084, 1087 are similar in nature to the electromagnet braking configuration shown in FIG. 5. However, other embodiments may employ a mix of braking configurations similar to those shown in FIG. 2, FIG. 5 and FIG. 6. Other embodiments may employ electromagnetic brakes having at least one display arm brake component that is non-pivotally attached to the display arm; and at least one axial brake component that is held such that it will not rotate about the display arm pivot point.

In one embodiment touch sensitive zones 1091, 1092, 1093 and 1094 uses capacitive touch detection. In other embodiments one touch sensitive zone may use one or more touch sensing technologies that are different from touch sensing technologies used by other touch sensitive zones.

Figure 11A:
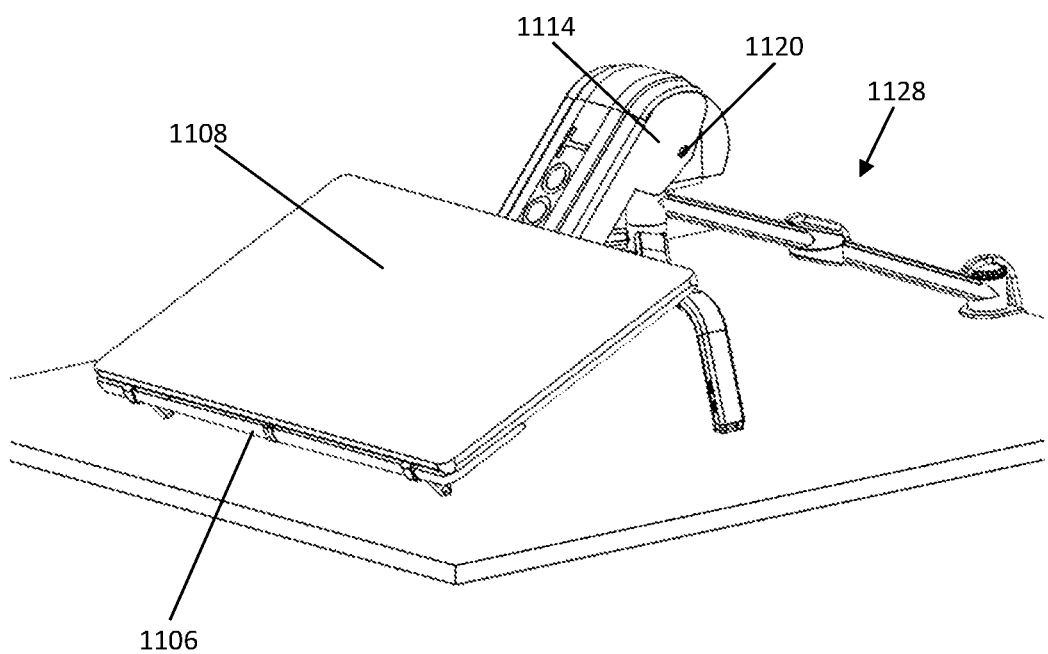
FIG. 11A illustrates a perspective view where of a display support system with touch actuator zone as a touchbar under the display.

FIG. 11A illustrates a perspective view where of a display support system with touch actuator zone as a touchbar under the display. In one embodiment touchbar 1106 is a touch sensitive zone that is located behind the lower half of display 1108. Display 1108 is pivotally connected to display arm 1114. Display arm 1114 is pivotally connected to a base at display arm pivot point 1120. The base connects to a desk via anti-toppling arms 1128.

In one embodiment touch touchbar 1106 uses capacitive touch detection.

Figure 11B:
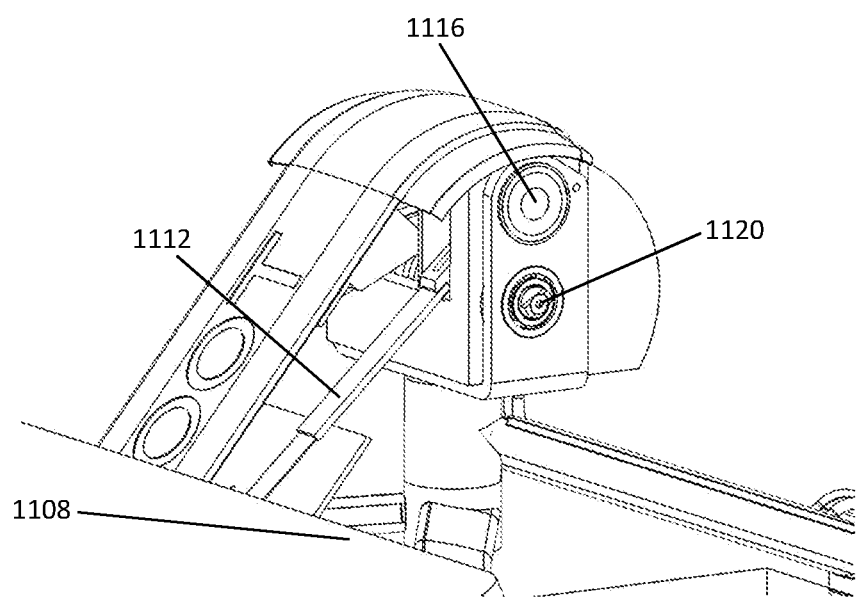
FIG. 11B illustrates an alternate and truncated perspective view of FIG. 11A where portions of display arm are invisible to show the electromagnetic braking system.

FIG. 11B illustrates an alternate and truncated perspective view of FIG. 11A where portions of FIG. 11A display arm 1114 are invisible to show the electromagnetic braking system. As in FIG. 11A, display 1108 is pivotally connected to display arm 1114 (partially invisible), which is pivotally connected to a base at display arm pivot point 1120. Electromagnet 1116 is positioned to adhere to a magnetic braking surface on the display arm (invisible). When electromagnet 1116 is energized it adds friction to the pivoting movement of the display arm (partially invisible) about pivot point 1120.

As disclosed above, various embodiments are directed towards providing useful mechanisms for using touch sensitive zones on or near the display to control electrical brake components to provide friction to the axial movement of the display arm and thus lock the display arm in place are among the considerations, that embodiments of the present invention have been made.

The above specification, examples, and data provide a complete description of the manufacture and use of the composition various embodiments. Since many embodiments of the invention can be made without departing from the spirit and scope of the invention, the invention resides in the claims hereinafter appended.

Although specific embodiments have been illustrated and described herein, a whole variety of alternate and/or equivalent implementations may be substituted for the specific embodiments shown and described without departing from the scope of the present disclosure. Thus, although the subject matter has been described in language specific to structural features and/or methodological acts, it is also to be understood that the subject matter defined in the appended claims is not necessarily limited to the specific features or acts described. Rather, the specific features and acts are disclosed as example forms of implementing the claims. This application is intended to cover any adaptations or variations of the embodiments discussed herein.

The invention claimed is:

1. An apparatus usable to support a flat panel display, the apparatus comprising:
   a base assembly connection;
   a display connection to mount a flat panel display or a display holder;
   at least one rigid display arm having pivotal connections on opposite ends of the display arm including a base-end pivotal connection at the end of the display arm closer to the base assembly connection, wherein one or more of the display arms pivotally connect between the base assembly connection and the display connection, wherein the base-end pivotal connections has a pivot point configured to pivot the display arm on a pivot axis not aligned with the display arm, so that the display arm pivots around the pivot point of the pivotal connection and the pivoting repositions the display arm and moves the flat panel display;

brake components of a first pivotal connection including at least one display arm brake component that is non-pivotally attached to the display arm, and at least one axial brake component that is held such that it will not rotate about the pivot point of the first pivotal connection;

wherein at least one of the brake components requires electrical power to activate;

at least one touch sensitive zone, located near or on one or more of the following locations on the display holder or the flat panel display: back side perimeter, right side, left side, top side, bottom side, front side bezel; and at least one electric circuit to control power to the at least one of the brake components;

wherein the apparatus is configured so that when the touch sensitive zone detects a touch, the at least one of the brake components is de-energized such that the display arm can pivot with reduced torsional resistance around the base-end pivotal connection; and wherein the apparatus is configured so that when the touch sensitive zone detects no touch, the at least one of the brake components is energized such that it will attract to another of the brake components and create friction, thus adding torsional resistance to the display arm pivoting around the pivot point of the base-end pivotal connection.

2. The apparatus of claim 1, wherein one of the display arm brake component or the axial brake component is an electromagnet and the other is a magnetic braking surface.

3. The apparatus of claim 1, wherein the at least one touch sensitive zone includes multiple touch sensitive zones and the brake components include multiple groupings of brake components, and different touch sensitive zones control different groupings of brake components.

4. The apparatus of claim 1, wherein a touch sensitive zone comprises a capacitive sensor.

5. The apparatus of claim 1, wherein a touch sensitive zone comprises a photo interrupter sensor.

6. The apparatus of claim 1, wherein a touch sensitive zone comprises a touch resistance sensor.

7. The apparatus of claim 1, wherein a touch sensitive zone comprises a surface acoustic wave touch sensor.

8. The apparatus of claim 1, wherein the display arm has an upward torque applied to it to prevent a display from falling.

9. The apparatus of claim 1, wherein the active brake component power is variable.

10. The apparatus of claim 2, wherein a brake pad material is placed between the display arm brake component and the axial brake component.

11. The apparatus of claim 10, wherein the brake pad material is magnetoviscous.

12. The apparatus of claim 2, wherein the magnetic braking surface is ferromagnetic.

13. The apparatus of claim 12, wherein the magnetic braking surface is iron.

14. The apparatus of claim 1, wherein the display connection to the flat panel display is configured to allow an in-plane rotation of the flat panel display around a rotation axis orthogonal to a largest display surface of the flat panel display, such that none of the brake components are configured to add resistance to the in-plane rotation.

15. The apparatus of claim 1, wherein the at least one touch sensitive zone is attached to the display holder, the display connection, or an accessory arm, such that the flat panel display is removable from the apparatus without affecting a wiring of the at least one touch sensitive zone.

16. The apparatus of claim 1, wherein the brake components of the first pivotal connection are located at one or more of the base-end pivotal connection or the pivotal connection on the opposite end of the display arm.

17. An apparatus usable to support a flat panel display, the apparatus comprising:

a base assembly connection;

a display connection to mount a flat panel display or a display holder;

at least first and second rigid display arms, each display arm having pivotal connections on opposite ends of the display arm including a base-end pivotal connection at the end of the display arm closer to the base assembly connection, wherein the display arms pivotally connect between the base assembly connection and the display connection, wherein the base-end pivotal connections each have a pivot point configured to pivot the display arm on a pivot axis not aligned with the display arm, so that the display arm pivots around the pivot point of the pivotal connection and the pivoting repositions the display arm and moves the flat panel display;

a first grouping of brake components of a first pivotal connection of the first display arm including at least one display arm brake component that is non-pivotally attached to the first display arm, and at least one axial brake component that is held such that it will not rotate about the pivot point of the first pivotal connection;

a second grouping of brake components of a separate second pivotal connection of the second display arm including at least one display arm brake component that is non-pivotally attached to the second display arm, and at least one axial brake component that is held such that it will not rotate about the pivot point of the second pivotal connection;

wherein at least one component of the first grouping of brake components and at least one component of the second grouping of brake components requires electrical power to activate;

at least two touch sensitive zones, located near or on one or more of the following locations on the display holder or the flat panel display: back side perimeter, right side, left side, top side, bottom side, front side bezel, wherein each of the at least two touch sensitive zones controls one or more different groupings of brake components;

at least one electric circuit to control power to the at least one of the brake components;

wherein the apparatus is configured so that when a first zone of the at least two touch sensitive zones detects a touch, the at least one component of the first grouping of brake components is de-energized such that the first display arm can pivot with reduced torsional resistance around the first display arm base-end pivotal connection;

wherein the apparatus is configured so that when the first zone of the at least two touch sensitive zones detects no touch, the at least one component of the first grouping of brake components is energized such that it will attract to another component of the first grouping of brake components and create friction, thus adding torsional resistance to the display arm pivoting around the pivot point of the first display arm base-end pivotal connection;

wherein the apparatus is configured so that when a second zone of the at least two touch sensitive zones detects a touch, the at least one component of the second grouping of brake components is de-energized such that the second display arm can pivot with reduced torsional resistance around the second display arm base-end pivotal connection; and wherein the apparatus is configured so that when the second zone of the at least two touch sensitive zones detects no touch, the at least one component of the second grouping of brake components is energized such that it will attract to another component of the second grouping of brake components and create friction, thus adding torsional resistance to the display arm pivoting around the pivot point of the second display arm base-end pivotal connection.

18. The apparatus of claim 17, wherein the apparatus is configured so that the first zone does not control the second grouping of brake components, and so that the second zone does not control the first grouping of brake components.

19. The apparatus of claim 17, wherein the apparatus is configured so that the first zone controls both the first grouping of brake components and the second grouping of brake components, and so that the second zone does not control the first grouping of brake components.

\* \* \* \* \*